(12) United States Patent
Yamazaki

(10) Patent No.: US 6,507,334 B1
(45) Date of Patent: Jan. 14, 2003

(54) INPUT DEVICE FOR ELIMINATING LOAD LOADED ON CONNECTION BETWEEN A PLURALITY OF TERMINALS OF PARTS OF ROTATIONAL ELECTRICAL COMPONENT AND CIRCUIT BOARD FOR CONNECTING THESE TERMINALS WHEN ROTATIONAL ELECTRICAL COMPONENT IS INCLINED

(75) Inventor: Kenji Yamazaki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/569,231

(22) Filed: May 11, 2000

(30) Foreign Application Priority Data

May 13, 1999 (JP) .......................................... 11-133300
May 13, 1999 (JP) .......................................... 11-133301

(51) Int. Cl.[7] ................................................ G09G 5/00
(52) U.S. Cl. ...................................................... 345/156
(58) Field of Search ................................. 345/156, 164, 345/165, 166, 167; 200/19.07, 19.18

(56) References Cited

U.S. PATENT DOCUMENTS 5,952,628 A * 9/1999 Sato et al. ........................ 200/4
6,340,801 B1 * 1/2002 Fukuda et al. ................. 200/18

FOREIGN PATENT DOCUMENTS

JP  9-298106   11/1997
JP  10-326144  12/1998

* cited by examiner

*Primary Examiner*—Richard Hjerpe
*Assistant Examiner*—Ronald Laneau
(74) *Attorney, Agent, or Firm*—Brinks Hofer Gilson & Lione

(57) ABSTRACT

A rotational electrical component having terminals and a circuit board connected to the terminals are provided, extra portions are formed on the respective terminals, and the rotational electrical component is mounted on the circuit board by means of a mounting leg. When the rotational electrical component is inclined by means of operation of an operation shaft, the extra portions are bent.

14 Claims, 13 Drawing Sheets

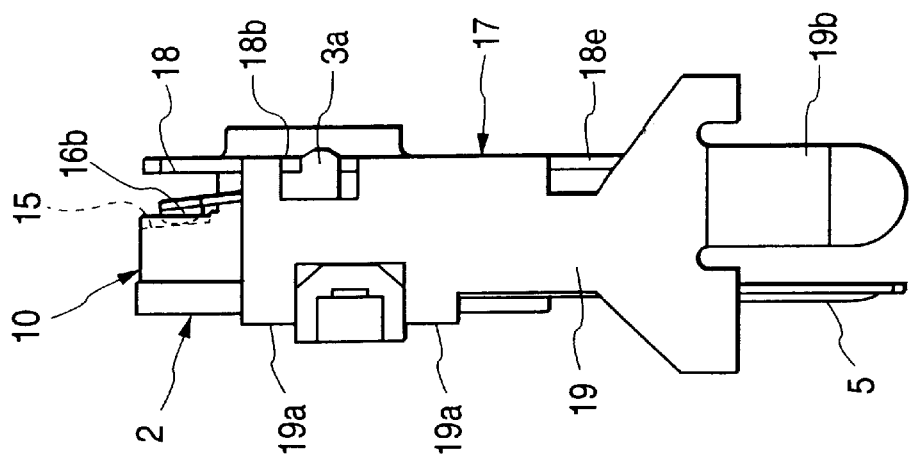
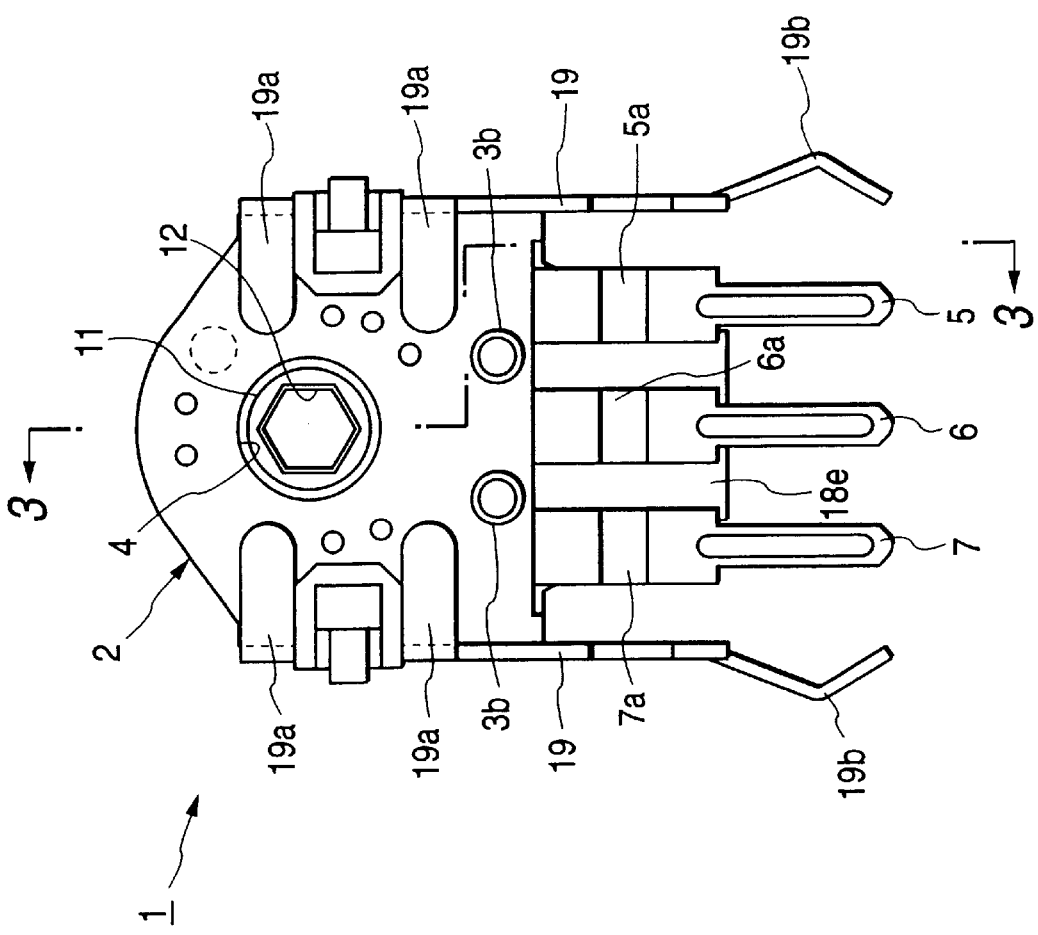

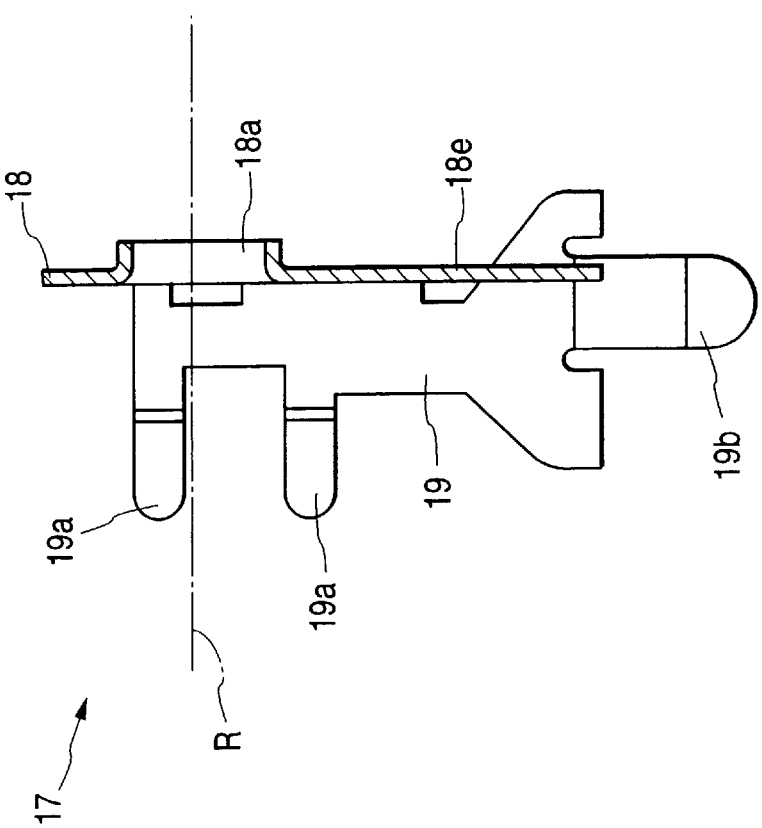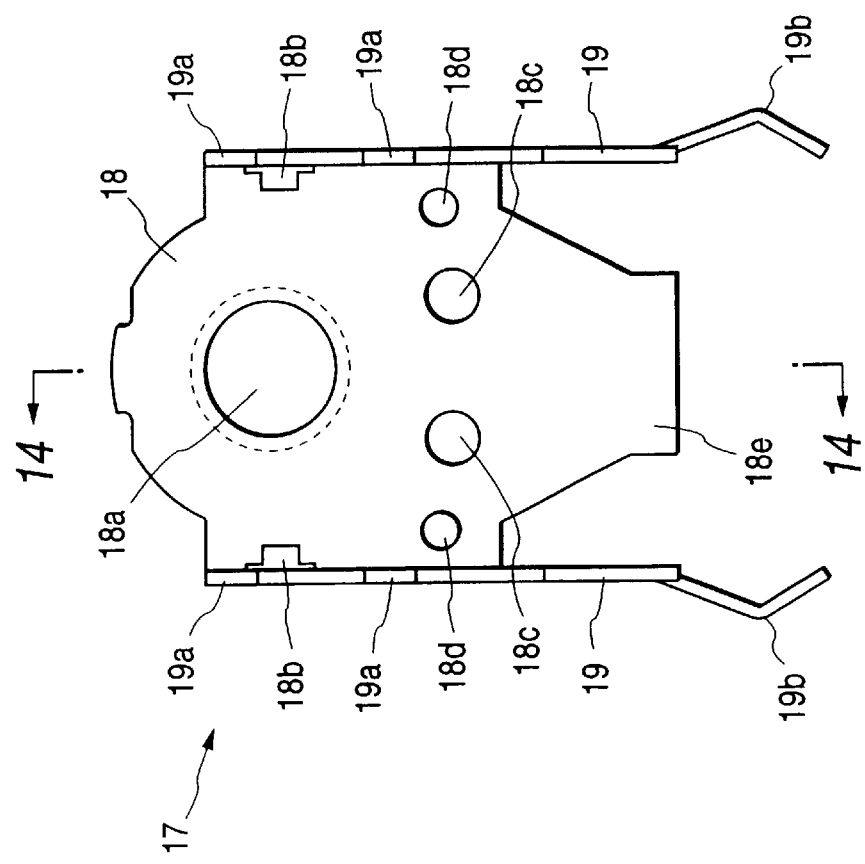

INPUT DEVICE FOR ELIMINATING LOAD LOADED ON CONNECTION BETWEEN A PLURALITY OF TERMINALS OF PARTS OF ROTATIONAL ELECTRICAL COMPONENT AND CIRCUIT BOARD FOR CONNECTING THESE TERMINALS WHEN ROTATIONAL ELECTRICAL COMPONENT IS INCLINED

BACKGROUND OF THE INVENTION

1. Field of the Invention

This invention relates to an input device for controlling screen scroll on a display by operating rotationally a rotation member.

2. Description of the Related Art

Input devices of this type for controlling screen scroll on a display by operating rotationally a rotation member of a rotational electrical component have been known heretofore.

A rotary encoder is exemplified as the above-mentioned rotational electrical component for description of the input device according to the conventional art with reference to FIG. 20 to FIG. 23.

The input device comprises a rotary encoder 41 fixed to a circuit board 54, the rotary encoder 41 comprises a rotation member 46 having a detection target, a support member 42 having a detector, a moderation plate 52 that elastically contacts with the rotation member 46, and a mounting plate 53 for holding the rotation member 46, support member 42, and moderation plate 52 together. The rotation member 46 is rotatably supported by a fixing member comprising the support member 42, moderation plate 52, and mounting plate 53.

The support member 42 is formed as a pentagonal base board consisting of insulative synthetic resin, has an fitting hole 43 formed at the center thereof, and provided with a detector 44 comprising three conductive metal elastic pieces 44a, 44b, and 44c and terminals 45a, 45b, and 45c electrically connected to the conductive metal elastic pieces 44a, 44b, and 44c formed by insert molding.

The rotation member 46, which is comprised of a disk consisting of insulative synthetic resin material, has a rotation shaft 47 at the center thereof formed in a piece, the rotation shaft 47 has a flat area on the inside circumference surface on one end, and a hole 48 to which an operation shaft 60 described hereinafter is to be inserted is formed so as to extend in the rotation shaft line R direction and so as to penetrate to the other end of the rotation shaft 47. To avoid contact with the operation shaft 60 when the operation shaft 60 is inclined, the other end side of the hole 48 is formed so as to have a large diameter portion 48a having a larger diameter than the one end. A ring-shaped conducting plate (not shown in the drawing) is embedded on the rotation member 46, a plurality of conducting portions 49, which are a part of the conducting plate, are projected from the surface of the rotation member 46 and located at regular intervals on concentric circumferences round the center of the rotation shaft 47 for serving as detection targets 50. On the back side of the rotation member 46, and radial ridges 51 comprising a plurality of ridges that extends radially from the rotation shaft 47 are formed on the entire circumference. The one end of the rotation shaft 47 of the rotation member 46 is inserted into the fitting hole 43 of the support member 42 so that the plurality of conducting portions 49 are brought into slidable contact with three conductive metal elastic pieces 44a, 44b, and 44c.

The moderation plate 52 is formed by press working of a metal sheet spring material, and has a projection 52 that is in contact with the radial ridges 51 of the rotation member 46 at the end.

The mounting plate 53, which is formed by bending both sides of a metal rectangular plate to be formed into a C-shaped cross section, has four pawls 53a, a pair of mounting legs 53b, and an fitting hole 53c formed by press burring work. The mounting plate 53, to the back side of which the rear end of the moderation plate 52 is fixed, is located on the back side of the rotation member 46, the other end of the rotation shaft 47 is inserted into the fitting hole 53c and four pawls 53a are folded to thereby hold the rotation member 46, support member 42, and moderation plate 53 tightly together, and the projection 52a of the moderation plate 52 is positioned in the groove of the radial ridges 51 of the rotation member 46.

Thereby, the above-mentioned fixing member comprising the support member 42, moderation plate 52, and mounting plate 53 is formed, and the rotation member 46 is supported by the fixing member rotatably by means of the rotation shaft 47 inserted into the fitting holes 43 and 53c. The plurality of conducting portions 49 and detection targets 50 constitute a pulse signal generating unit for generating the pulse signal concomitantly with rotation of the rotation member 46.

On the other hand, the circuit board 54 has terminal insertion holes 54a, fixing holes 54b, and a relief hole 54c, and a push button switch 55 is fixed at the position that faces to the terminal insertion holes 54a and the fixing holes 54b with interposition of the relief hole 54c. In the structure of the push button switch 55, a body 56 fixed and connected to the circuit board 54 is provided with an actuator 56a, a coil spring 57 is mounted on the one end of the body 56, and a shaft support member 58 having a slotted hole 58a with a top open end at the other end of the body 56 is formed.

The rotary encoder 41, which has the structure as described herein above, is fixed to the circuit board 54 by soldering the terminals 45a, 45b, and 45c which are inserted through the terminal insertion holes 54a and fixing holes 54b, and the pair of mounting legs 53c at the position that faces to the push button switch 55, and thus the terminals 45a, 45b, and 45c are electrically connected to the circuit board 54.

A disk operation body 59 is disposed between the rotary encoder 41 and the push button switch 55, a portion of which disk operation body 59 is positioned in the relief hole 54c, both ends of an operation shaft 60 that penetrates through the center of the operation body 59 fixedly are inserted into the hole 48 of the rotation member 46 and the slotted hole 58a of the push button switch 55 respectively. The operation shaft 60 is rotatable together with operation body 59 and the rotation member 46, and supported so as to be pivoted only in the vertical direction (directions of arrows B and C) of the slotted hole 58a on the one end of the rotation shaft 47.

A bush 61 is fit on the one end of the operation shaft 60, the coil spring 57 and the actuator 56a are in contact with the bush 61 to thereby hold the operation shaft 60 in parallel to the circuit board 54, the bush 61 faces to the body 56 of the push button switch 55 apart with interposition of a distance H, and the one end of the body 56 is disposed apart from the one end of the rotation shaft 47 of the rotation member 46 with interposition of a distance L1.

When an operator rotates the operation body 59 with a finger in this state, the rotation member 46 is rotated in the same direction as that of the operation body 59 together with the operation shaft 60 while the projection 52a of the moderation plate 52 is being brought into elastic contact with the ridges and grooves of the radial ridges 51 alternately to cause clicking sensation, three conductive metal elastic pieces 44a, 44b, and 44c repeats connection and disconnection with the plurality of conducting portions 49 concomitantly with rotation of the rotation member 46 to generate pulse signals, and pulse signals are sent out from the terminals 45a, 45b, and 45c as the rotation magnitude detection signal of the operation body 59 and supplied to the circuit board 54. At that time, because the flat side of the operation shaft 60 is fitted to the flat area provided on the inside circumferential surface of the hole 48, it is possible to connect the rotation member 46 with the operation shaft 60 without rattle, therefore the rotation of the operation body 59 is transmitted to the rotation member 46 consistently.

When an operator pushes the operation body 59 with a finger, the one end side of the operation shaft 60 to which the bush 61 is fitted is lowered and inclined by a distance H against the elastic force of the coil spring 57 in the direction of the arrow C round the one end of the rotation shaft 47, the bush 59 pushes the actuator 56a of the push button switch 55 to switch the push button switch 55 between On/OFF, and the ON/OFF signal of the push button switch 55 is supplied to the circuit board 54. At that time, the inclination angle θ of the operation shaft 60 is equal to $\tan^{-1}$ (distance H÷distance L1), the other end of the operation shaft 60 moves by a distance L3×tan θ in the radial direction in the hole 48a. Furthermore, as described herein above, because the fitting between the operation shaft 60 and the hole 48 is flat-flat fitting, the rotation member 46 is inclined with interlocking to inclination of the operation shaft 60, and a large load is loaded on the rotation member 46 and a bearing of the mounting plate 53 that supports the rotation member 46 rotatably. When the operator stops pressing of the operation body 59, the operation body 59 and the operation shaft 60 are restored to the original position due to elastic force of the coil spring 57 (in the direction of the arrow B).

As the result, the rotation magnitude detection signal and ON/OFF signal of the push button switch 55 supplied to the circuit board 54 are subjected to arithmetic by means of a CPU, not shown in the drawing, provided on the circuit board 54, and then supplied to a display apparatus not shown in the drawing, and screen scroll and cursor control are carried out on a display not shown in the drawing.

Next, a method for fabrication of a rotary encoder 41 is described. First, a unit is fabricated by bonding the moderation plate 52 on the back side of the mounting plate 53 by use of a suitable bonding agent in the bonding process. In the fabrication process, the other end of the rotation shaft 47 of the rotation member 46 is inserted into the fitting hole 53c of the mounting plate 53, and then three conductive metal elastic pieces 44a, 44b, and 44c are faced to the conducting portions 49, the support member 42 is placed over the rotation member 46, and the one end of the rotation shaft 47 is inserted into the fitting hole 43. Thereafter, the four pawls 53a of the mounting plate 53 are folded to the support member 42 side to thereby hold the rotation member 46, support member 42, and moderation plate 52, and thus the fabrication of the rotary encoder 41 is completed.

However, in the case of the input device according to the conventional art as described herein above, when the operation shaft 60 is inclined, at the one end of the rotation shaft 47, the upward force F3 and downward force F4 are exerted on the contact points between the hole 48 of the rotation member 46 and the other end of the operation shaft 60. As the result, a moment is exerted on the rotary encoder 41, and the rotary encoder 41 is inclined in the direction of the arrow A. As the result, the load is exerted on the soldered portions 62 (connection) between the terminals 45a, 45b, and 45c and the circuit board 54, and the terminals 45a, 45b, and 45c can be disconnected from the circuit board 54. Furthermore, the operation shaft 60 cannot be inclined smoothly due to the reaction force of F3 and F4, and that is a problem.

Because the operation shaft 60 and the rotation member 42 are rotated together and the size of the hole 48 of the rotation shaft 47 is approximately equal to the outside size of the operation shaft 60, it is difficult to insert the other end of the operation shaft 60 into the hole 48 of the rotation shaft, much fabrication work is required to insert the operation shaft 47 into the hole 48.

The large diameter portion 48a of the hole 48 is necessary to avoid the contact with the operation shaft 60 when the operation shaft 60 is inclined, the large diameter results in a larger rotation member 46, and as the result the size of the input device 41 is large inevitably.

Furthermore, it is necessary to prepare a unit formed by bonding the mounting plate 53 and the moderation plate 52 previously for fabrication of the rotary encoder 41, the fabrication efficiency is poor due to the bonding process to be carried out before fabrication process, and the bonding process increases the time required for the fabrication process.

Variation of the mounting position of the moderation plate 52 on the back side of the mounting plate 53 causes the variation of clicking position obtained by means of elastic contact between the ridges 52a of the moderation plate 52 and the ridges/grooves of the radial ridges 51, the variation causes mis-timing with the output of the above-mentioned rotation magnitude detection signal. To avoid the mis-timing, it is required to improve the mounting accuracy, the positioning work of the moderation plate 52 becomes very complex, and the such positioning work results in high fabrication cost due to increased fabrication work, that is a problem.

The present invention has been accomplished to solve the above-mentioned problem of the conventional art, and it is an object of the present invention to provide an input device that is capable of maintaining the connection between terminals and the circuit board in good condition when the rotational electrical member is inclined by eliminating the load exerted on the contact between the terminal and the circuit board. It is another object of the present invention to provides a small-sized input device that is fabricated easily because the operation shaft is easily inserted tightly, that is not involved in the problem when the operation shaft is inclined because the reduced force is exerted on the contact point between the hole of the rotation member and the operation shaft at the time, and that realizes smooth inclining operation of the operation shaft.

It is further another object of the present invention to provide a rotational electrical component that can be fabricated without bonding process prior to the fabrication process and that can be fabricated easily because the mounting position of the moderation plate is positioned easily.

SUMMARY OF THE INVENTION

To achieve the above-mentioned object, an input device of the present invention comprises; a rotational electrical component having a fixing member, a rotation member supported rotatably by the fixing member, and a terminal for generating the electric signal generated concomitantly with rotation of the rotation member, a circuit board to which the terminal is connected and the electric signal is supplied, an operation shaft that is formed so as to extend in the shaft line direction of the rotation member having the one end fitted to the rotation member for rotating the rotation member, and an operation body provided to the operation shaft, wherein the terminal has a flexible portion that is bent when the rotational electrical component is inclined concomitantly with pushing operation of the operation body in the perpendicular direction to the shaft center of the rotation member.

Accordingly, when the operation body is pushed in the direction perpendicular to the shaft line of the rotation member, because the flexible portion of the terminal is bent and the rotational electrical component is inclined, the connection between the terminal and the circuit board is not subjected to a large stress, the connection between the terminal and the circuit board is maintained in good condition, and the operation body is pushed smoothly.

In the above-mentioned structure; a mounting plate for mounting the rotational electrical component on the circuit board is provided to the fixing member, and an extension that is in contact with the circuit board is provided to the mounting plate so as to face to the opposite side of the terminal that is facing to the operation body, and the rotational electrical component is inclined round the contact portion between the extension and the circuit board concomitantly with pressing operation of the operation body.

Accordingly, because the rotational electrical component is inclined smoothly round the contact portion, the operation body can be pushed smoothly.

Furthermore, in the above-mentioned structure; the extension of the mounting plate is provided so as to be in contact with the plate surface of the circuit board.

Accordingly, the rotational electrical component is rendered inclinable with simple structure without soldering.

In the above-mentioned structure, an extra portion is provided on the terminal, and the flexible portion is formed of the extra portion.

Accordingly, the rotational electrical component can be inclined smoothly.

Furthermore, in the above-mentioned structure, the extra portion is formed by bending the terminal in C-shape.

Accordingly, the rotational electrical component can be inclined smoothly.

Furthermore, in the above-mentioned structure, the extra portion is formed so that the opening of C-shape is faced to the operation body.

Accordingly, the rotational electrical component can be inclined smoothly.

In the above-mentioned structure, a plurality of terminals are provided, and the plurality of terminals are formed projectingly from the fixed member toward circuit board so as to be arranged on one plane perpendicular to the rotation shaft line of the operation shaft.

Accordingly, the rotational electrical component provided with the plurality of terminals can be inclined smoothly concomitantly with pushing of the operation body.

In the above-mentioned structure, a push button switch that is driven by means of the pushing operation of the operation body is provided.

Accordingly, a plurality of inputs can be supplied.

To achieve the above-mentioned object, an input device of the present invention is provided with; a fixing member, a rotation member supported rotatably by the fixing member having a hole that extends in the rotation shaft line direction, and rotational electric component for generating electric signal concomitantly with rotation of the rotation member, an operation shaft having the one end inserted fitly into the hole of the rotation member for rotating the rotation member, and an operation body provided to the operation shaft, wherein; the hole has a polygonal hole provided on the operation body side into which the one end of the operation shaft is inserted fitly and has a hole having a diameter larger than that of the polygonal hole provided next to the polygonal hole, a taper having the diameter that decreases from a large diameter at the one end facing to the operation body to a small diameter at the other end on the inside circumferential surface of the polygonal hole is provided, and a step is formed between the polygonal hole and the large diameter hole.

Accordingly, because the one end of the operation shaft is fitted to the center of the rotation body, the inclination angle of the operation shaft can be reduced in comparison with the conventional input device, the operation body can be pushed smoothly, the rotation member can be made small-sized, as the result, the small input device can be realized, and the operation shaft can be inserted fitly into the hole with aid of guiding action of the taper, and the fabrication efficiency is improved.

In the above-mentioned structure, an angle made by the taper and the rotation shaft line is 3 degrees.

Accordingly, the operation shaft is supported stably by the taper when the operation shaft is inclined concomitantly with pushing of the operation body.

Furthermore, in the above-mentioned structure, the polygonal hole is a hexagonal hole.

Accordingly, the operation shaft can be inclined smoothly at any rotation angle position of the rotation member.

To achieve the above-mentioned object of the present invention, an input device of the present invention is provided with; a fixing member and a rotation member supported rotatably by the fixing member, wherein a through hole that penetrates in the rotation shaft line direction of the rotation member is provided on the fixing member at the position outside the rotation member.

Accordingly, the input device such as an encoder can be fabricated only by mounting component parts of the fixing member and the rotation member to the tool successively, as the result the production efficiency is improved.

Furthermore, the fixing member comprises a support member, a moderation plate for causing clicking sensation concomitantly with rotation of the rotation member, and a mounting plate for holding the support member and the moderation plate together one on another.

Accordingly, the mounting position of the moderation plate on the mounting plate can be determined only by inserting the tool into the through hole, as the result the production efficiency is improved because positioning work for positioning the moderation plate on the mounting plate is not necessary.

Two through holes are formed on the fixing member.

Accordingly, the positioning between component parts of the fixing member, particularly positioning of the moderation plate on the mounting plate, can be performed accurately.

A pair of stopper holes that face each other with interposition of the through hole are formed on the mounting plate on both sides of the through hole, and a pair of projections to be fitted to the pair of holes are provided on the support member.

Accordingly, mounting position of the support member on the mounting plate will not be displaced even after fabrication.

A pair of stopper holes that face each other with interposition of the through hole are formed on the mounting plate on both sides of the through hole, a pair of stopper holes that penetrate facing to the pair of stopper holes of the mounting plate are provided on the moderation plate, and a pair of projections for being inserted into the pairs of stopper holes of the respective mounting plate and moderation plate for engaging are provided projectingly on the support member.

Accordingly, mounting position of the support member on the mounting plate will not be displaced even after fabrication.

BRIEF DESCRIPTION OF THE DRAWINGS

FIG. 1 is a front view of a rotational electrical component in accordance with an input device of the present invention.

FIG. 2 is a side view of the rotational electrical component in accordance with the input device of the present invention.

FIG. 13 is a front view of a mounting plate provided to the rotational electrical component in accordance with the input device of the present invention.

FIG. 14 is a cross sectional view along the line 14—14 of FIG. 13.

DETAILED DESCRIPTION OF THE PREFERRED EMBODIMENTS

Figure 3:
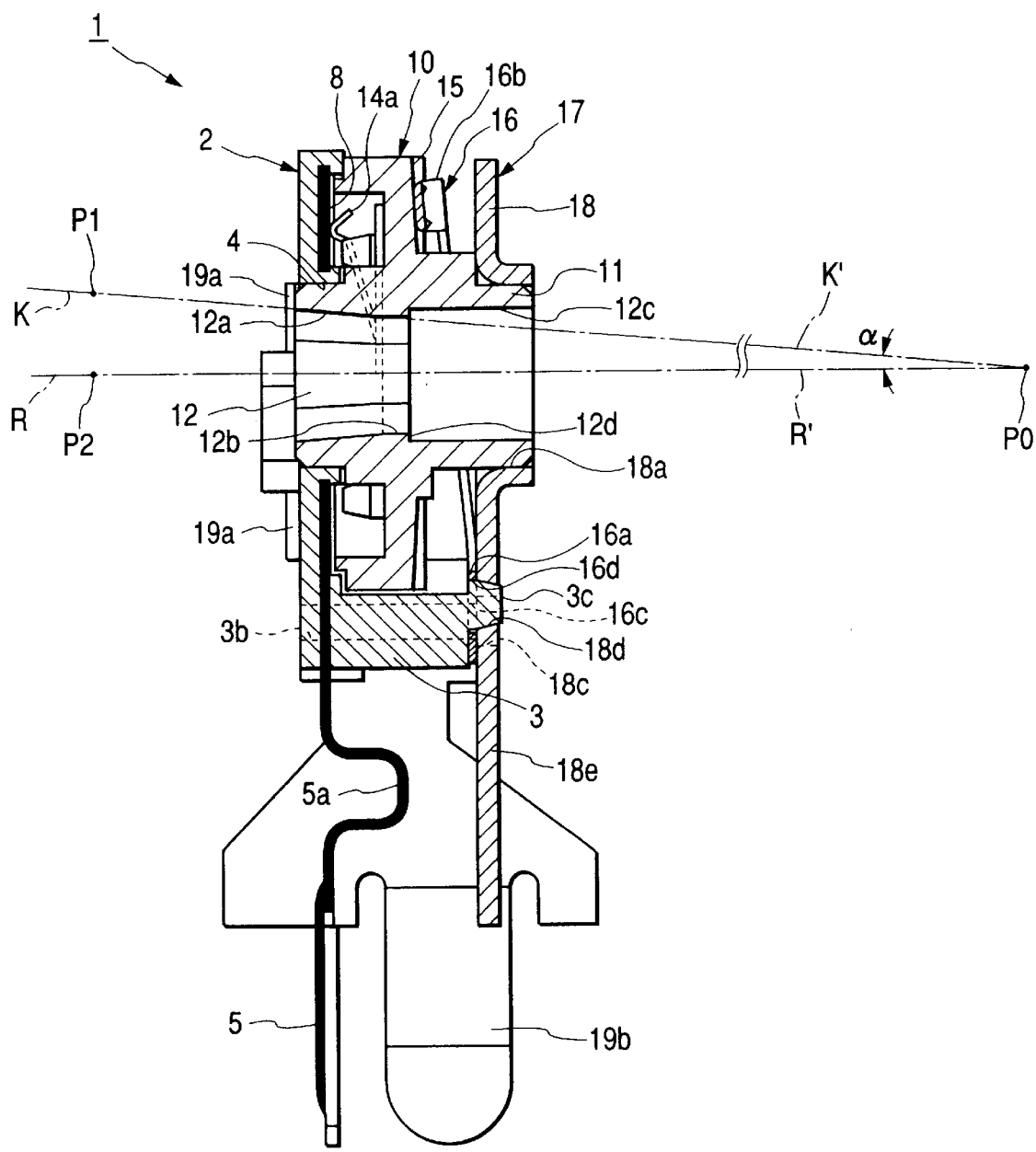
FIG. 3 is a cross sectional view along the line 3—3 of FIG. 1.

The one embodiment of an input device of the present invention will be described in detail hereinafter with reference to FIG. 1 to FIG. 19.

This input device comprises a rotary encoder 1 mounted on a circuit board 22. The rotary encoder 1 generates the electric signal concomitantly with relative rotation motion between a detector and a detection target. The rotary encoder 1 comprises a rotation member 10 having the detection target 20, a support member 2 having the detector 9, a moderation plate 16 that is in elastic contact with the rotation member 10, and a mounting plate 17 for holding the support member 2 and the moderation plate 16 together. A fixing member comprising the support member 2, the moderation plate 16, and the mounting plate 17 supports the rotation member 10 rotatably.

Figure 5:
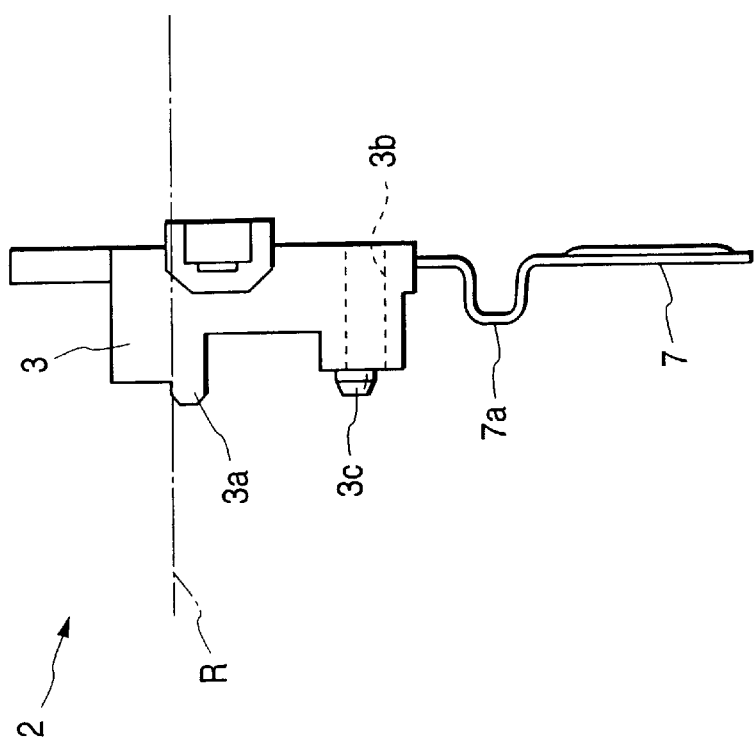
FIG. 5 is a side view of a support member provided to the rotational electrical component in accordance with the input device of the present invention.
Figure 4:
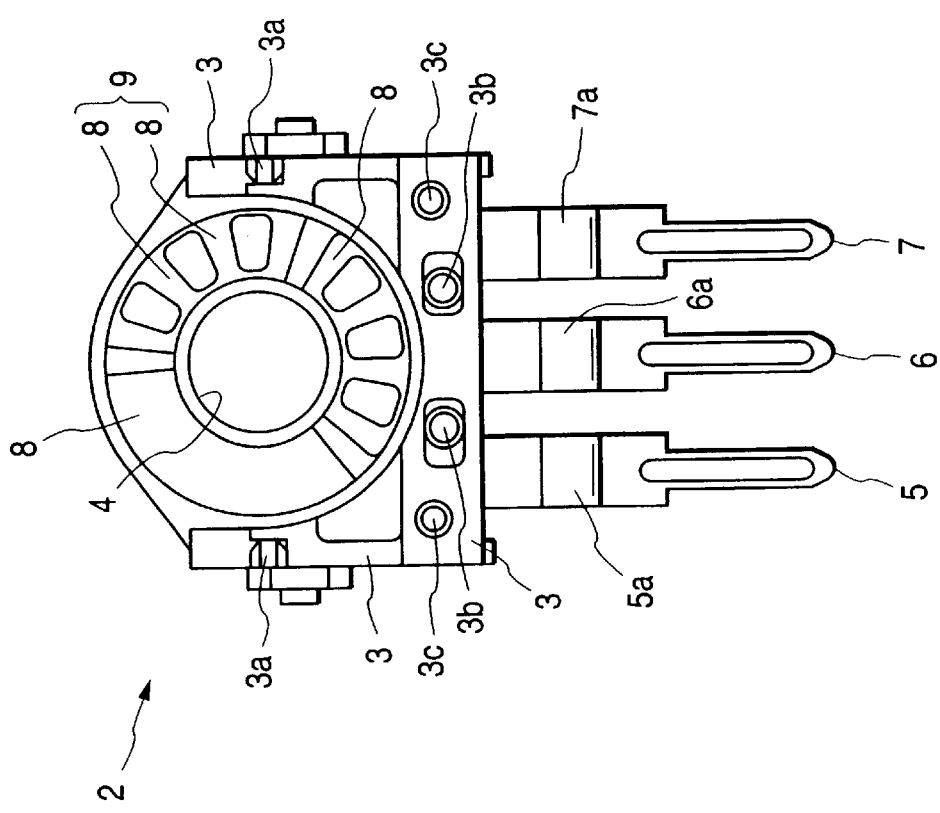
FIG. 4 is a back view of a support member provided to the rotational electrical component in accordance with the input device of the present invention.
Figure 6:
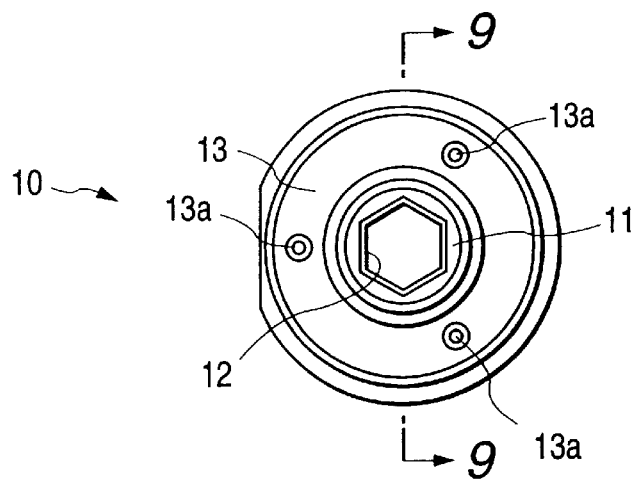
FIG. 6 is a front view of a rotation member provided to the rotational electrical component in accordance with the input device of the present invention.
Figure 7:
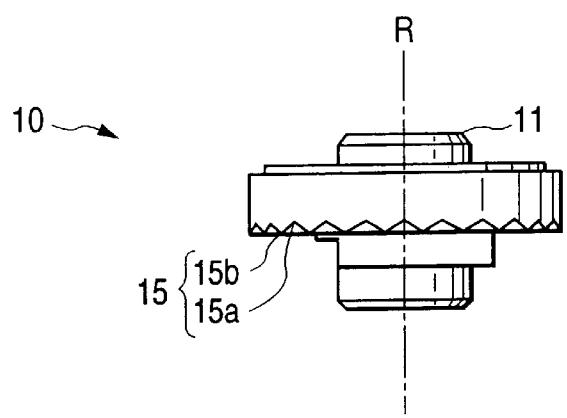
FIG. 7 is a side view of a rotation member provided to the rotational electrical component in accordance with the input device of the present invention.
Figure 8:
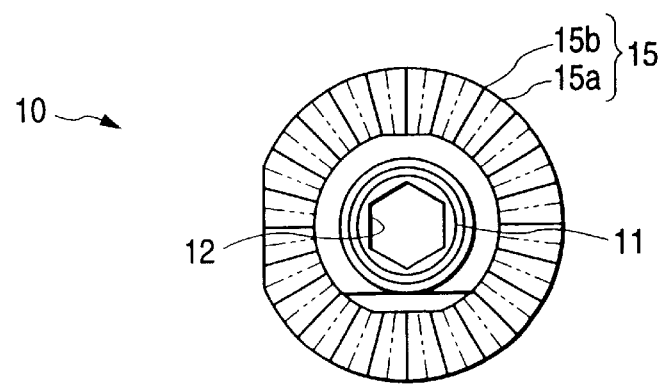
FIG. 8 is a back view of a rotation member provided to the rotational electrical component in accordance with the input device of the present invention.
Figure 9:
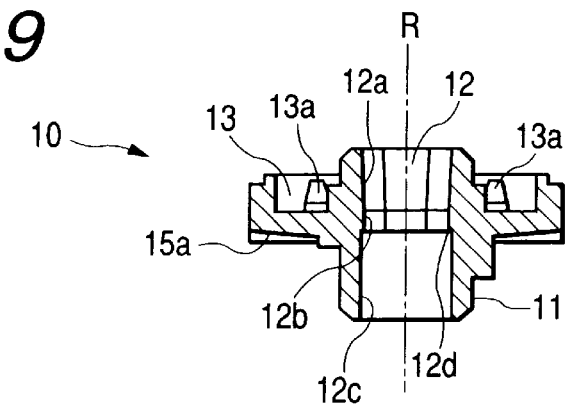
FIG. 9 is a cross sectional view along the line 9—9 of FIG. 6.
Figure 10:
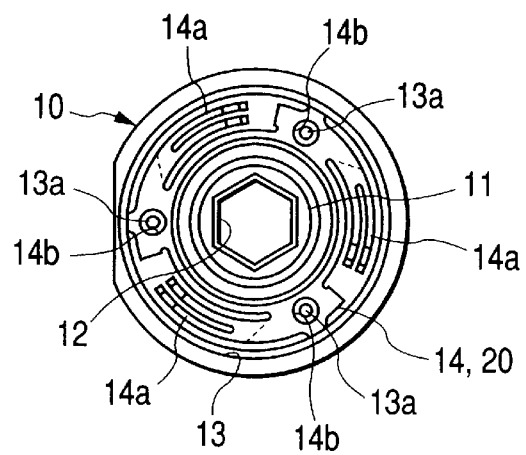
FIG. 10 is a front view for showing a slider mounted on the rotation member provided to the rotational electric component accordance with the input device of the present invention.

The support member 2 comprises an approximately pentagonal board consisting of insulative synthetic resin as shown in FIG. 4 and FIG. 5, a side wall 3 having C-shaped cross section is formed on the periphery of the support member 2, the side wall 3 has a pair of projections 3a at the end, two through holes 3b that extend through in the rotation shaft line R direction are formed, and a pair of projections 3c that face each other with interposition of both through holes 3b are formed on both sides of the through holes 3b. A circular fitting hole 4 is formed on the support member 2, an conducting plate not shown in the drawing is embedded so as to surround the fitting hole 4 and provided with three terminals 5, 6, and 7 formed of conductive sheet spring material that are connected electrically to the conducting plate by means of insert molding. A plurality of conducting portions 8, which are a part of the above-mentioned conducting plate, are exposed on the concentric circumference round the fitting hole 4 on the back side of the support member 2 and serve as the detector 9. The three terminals 5, 6, and 7 are formed in the same shape, and have respective extra portions 5a, 6a, and 7a formed in one piece respectively by folding.

The rotation member 10 comprises a disk consisting of insulative synthetic resin. As shown in FIG. 6 to FIG. 10, a rotation shaft 11 is formed monolithically at the center of the rotation member 10, and a hexagonal hole 12 to which an operation shaft 29, which will be described hereinafter, is to be inserted is formed at the one end of the rotation shaft 11 so as to extend through from the one end to the other end of the rotation shaft 11 in the rotation shaft line R direction. A ring-shaped groove 13 is provided on the surface of the rotation member 10 so as to surround the rotation shaft 11, three projections 13a are formed in the groove 13, a ring-shaped slider 14 consisting of conductive metal plate material and having three slider pieces 14a that are press-fitted respectively in the three holes 14b is supported in the groove 13. The slider 14 is served as the detection target 20.

On the back side of the rotation member 10, a radial ridges/grooves 15 comprising a plurality of grooves 15a and ridges 15b that extend in radially from the center of the rotation shaft 11 are formed alternately on the entire circumference. On the inside circumferential surface of the hole 12 of the rotation shaft 11, a taper 12a having the diameter that decreases gradually from a large diameter at the one end of the rotation member 10 to a small diameter at the other end is formed. The terminal end of the taper 12a forms a small diameter portion 12b that is parallel to the rotation shaft line R. A large diameter portion 12c is formed next to the small diameter portion 12b, and a step portion 12d is formed thereby at the terminal end of the taper 12a. As shown in FIG. 3, at the position on the one end side of the rotation member 10 with respect to the intersection P0 of the prolonged line K of the taper 12a and the rotation shaft line R, the inclination of the taper 12a is set so that an angle α made by a straight line K' that connects an arbitrary point PI on the prolonged line K and the intersection P0 and a straight line R' is set to be approximately 3 degrees. The one end of the rotation shaft 11 is inserted into the fitting hole 4 of the support member 2 so that the rotation member 10 is supported by the rotation shaft 11, and the three slider pieces 14a (only one slider piece is shown in the drawing) are in contact with the plurality of conducting portions 8 of the support member 2 slidingly.

Figure 11:
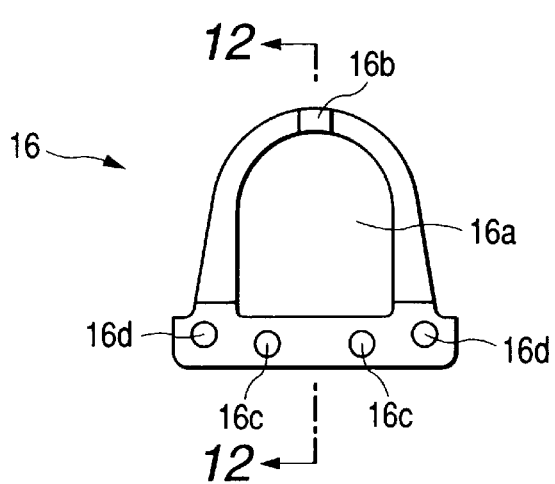
FIG. 11 is a front view of a moderation plate provided to the rotational electrical component in accordance with the input device of the present invention.
Figure 12:
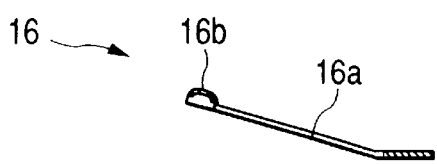
FIG. 12 is a cross sectional view along the line 12—12 of FIG. 11.

The moderation plate 16, which is formed by press-working of metal sheet spring material, has an approximately rectangular insertion through hole 16a at the center as shown FIG. 11 and FIG. 12, and has a projection 16b that projects to the front side at the end. The moderation plate 16 has two through holes 16c at the rear end, and a pair of stopper holes 16d facing each other are formed on both sides of these through holes 16c with interposition of both through holes 16c. As shown in FIG. 3, the other end of the rotation shaft 11 of the rotation member 10 is inserted through the insertion through hole 16a, the pair of projections 3c is inserted fitly into the pair of stopper holes 16d so as to be stopped, the pair of through holes 16c are faced to the pair of through holes 3b of the support member 2, and the projection 16b is in contact elastically with the radial ridges/grooves 15 of the rotation member 10.

The mounting plate is formed by means of folding work of a metal flat plate. As shown in FIG. 13 and FIG. 14, the mounting plate has a pair of side walls 19 formed by folding the edge at an right angle on both ends of the back wall 18, and each side wall 19 has two pawls and one mounting leg 19b, that is, the pair of side walls have total four pawls 19a and two mounting legs 19b on both sides. A circular fitting hole 18a is formed by means of press burring work on the back wall 18, two engaging holes 18b are formed on both sides with interposition of the fitting hole 18a. Two through holes 18c are formed through in the rotation shaft line R direction under the fitting hole 18a. A pair of stopper holes 18d that face each other with interposition of both through holes 18c are formed on both sides of the through holes 18c through in the rotation shaft line R direction. An extension 18e is formed on the bottom edge of the back wall 18 monolithically under the through holes 18c.

As shown in FIG. 1 to FIG. 3, the other end of the rotation shaft 11 is inserted into the fitting hole 18a so as to support the mounting plate 17. The pair of projections 3a of the support member 2 are inserted fitly into two engaging holes 18b respectively. The support member 2, the rotation member 10, and the moderation plate 16 are positioned between the pair of side walls 19. The through holes 16c of the moderation plate 16 and the through hole 3b of the support member 2 are faced to a pair of though holes 18c. The four pawls 19a are folded to the support member 2 side, and the four pawls 19a and the back wall 18 thereby hold the support member 2, the rotation member 10, and the moderation plate 16 together in-between.

Thereby, the above-mentioned fixing member comprising the support member 2, the moderation plate 16, and the mounting plate 17 is formed, and the rotation shaft 11 is inserted into the engaging holes 4 and 18a so that the rotation member 10 is supported rotatably by the fixing member. The through holes 3b, 16c, and 18c of the respective support member 2, moderation plate 16, and mounting plate 17 constitute two through holes that penetrate the fixing member, and these two through holes are disposed at the position aside from the rotation member 10 namely outside the rotation member in the plan view through in the rotation shaft line R direction. The detection target 20 comprising the slider 14 and the detector 9 comprising the plurality of conduction portions 8 constitute a pulse signal generating unit for generating the pulse signal concomitantly with rotation of the rotation member 10.

Figure 15:
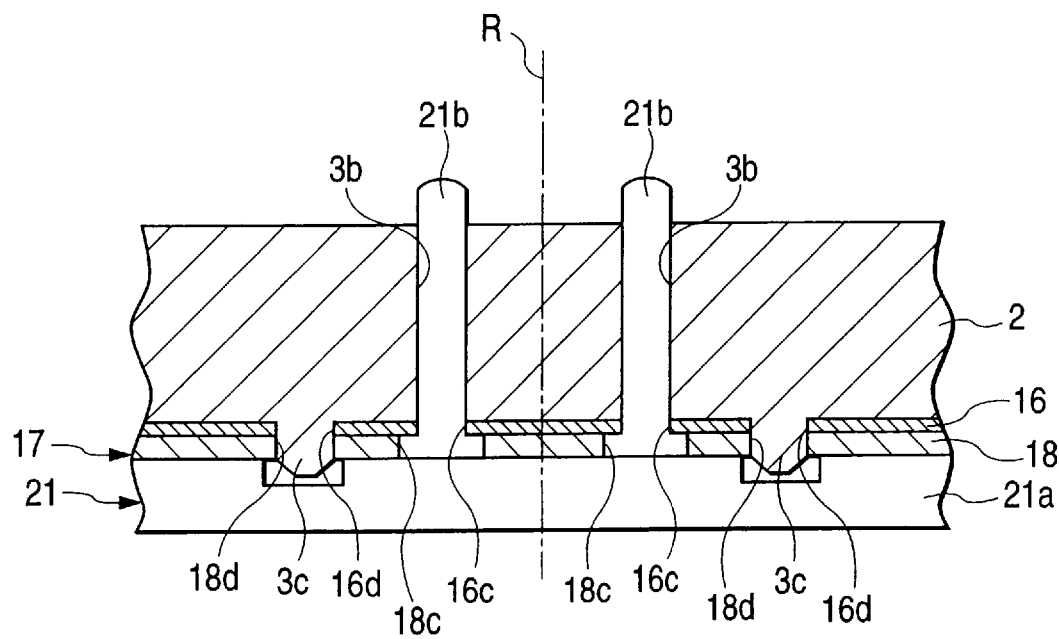
FIG. 15 is an explanatory diagram for describing the fabrication process of the rotational electrical component in accordance with the present invention.

Next, the fabrication process of the rotary encoder 1 having the structure as described hereinbefore will be described. As shown in FIG. 15, a tool 21 having two positioning pins 21b fixed vertically on a flat base 21a is used for fabrication as described herein under.

First, the two positioning pins 21b of the tool 21 are inserted into the two through holes 18c formed on the back wall 18 of the mounting plate 17 respectively and the mounting plate 17 is thereby fixed to the tool 21. Next, the two positioning pins 21b of the tools 21 are inserted into the two through holes 16c formed on the rear end of the modulation plate 16 to thereby fix the moderation plate 16 to the tool 21. As the result, the moderation plate 16 is brought into contact with the back wall 18 of the mounting plate 17, and the mounting plate 17 and the moderation plate 16 are placed one on the other so that a pair of stopper holes 18d and 16d are faced each other.

Next, the other end of the rotation shaft 11 of the rotation member 10 is inserted into the fitting hole 18a of the mounting plate 17 to fix the rotation member 10 to the tool 21. Subsequently, the back side of the support member 2 is faced to the tool 21, the two positioning pins 21b of the tool 21 are inserted into the two through holes 3b of the support member 2 respectively to thereby insert the pair of projections 3c into the pair of stopper holes 16d and 18d of the respective moderation plate 16 and mounting plate 17 fitly, and thus the support member 2 is fixed to the tool 21.

Thereafter, the four pawls 19a of the mounting plate 17 are folded to the support member side 2 to thereby hold the support member 2, the rotation member 10, and the moderation plate 16 together between the four pawls 19a and the back wall 18, and thus the fabrication process is completed. After completion of the fabrication, the support member 2 has been placed on the moderation plate 16 one on the other, the back wall 18 of the mounting plate 17 has been placed on the moderation plate 16 and holds the support member 2 and the moderation plate 16 together in cooperation with the four pawls 19a, and in this state the three terminals 5, 6, and 7 and the extension 18e are arranged in this order from the one end to the other end of the rotation member 10. As described herein above, in the fabrication process of the rotary encoder 1, the rotary encoder 1 can be fabricated only by mounting the mounting plate 17, the moderation plate 16, the rotation member 10, and the support member 2 on the tool 21 in the order successively without bonding process prior to the fabrication process unlike the conventional art, and the production efficiency is improved the more.

Because the mounting position on the mounting plate 17 of the moderation plate 16 is determined by means of the two positioning pins 21b, the position of the moderation plate 16 will not deviate with respect to the mounting plate 17 when the moderation plate 16 is brought into contact with the back wall 18 of the mounting plate 17. As the result, when the pair of projections 3c of the support member 2 are inserted into the pair of stopper holes 16d and 18d of the respective moderation plate 16 and the mounting plate 17, the pair of projections 3c can be inserted easily into the pair of stopper holes 16d and 18d even though both are in the strong fitting size relation. After the fabrication of the rotary encoder 1, because the pair of projections 3c of the support member 2 are fitted tightly to the pair of stopper hole 16d and 18d of the respective moderation plate 16 and mounting plate 17, the moderation plate 16 is mounted on the mounting plate 17 without rattle, and the mounting position will not deviate.

Figure 16:
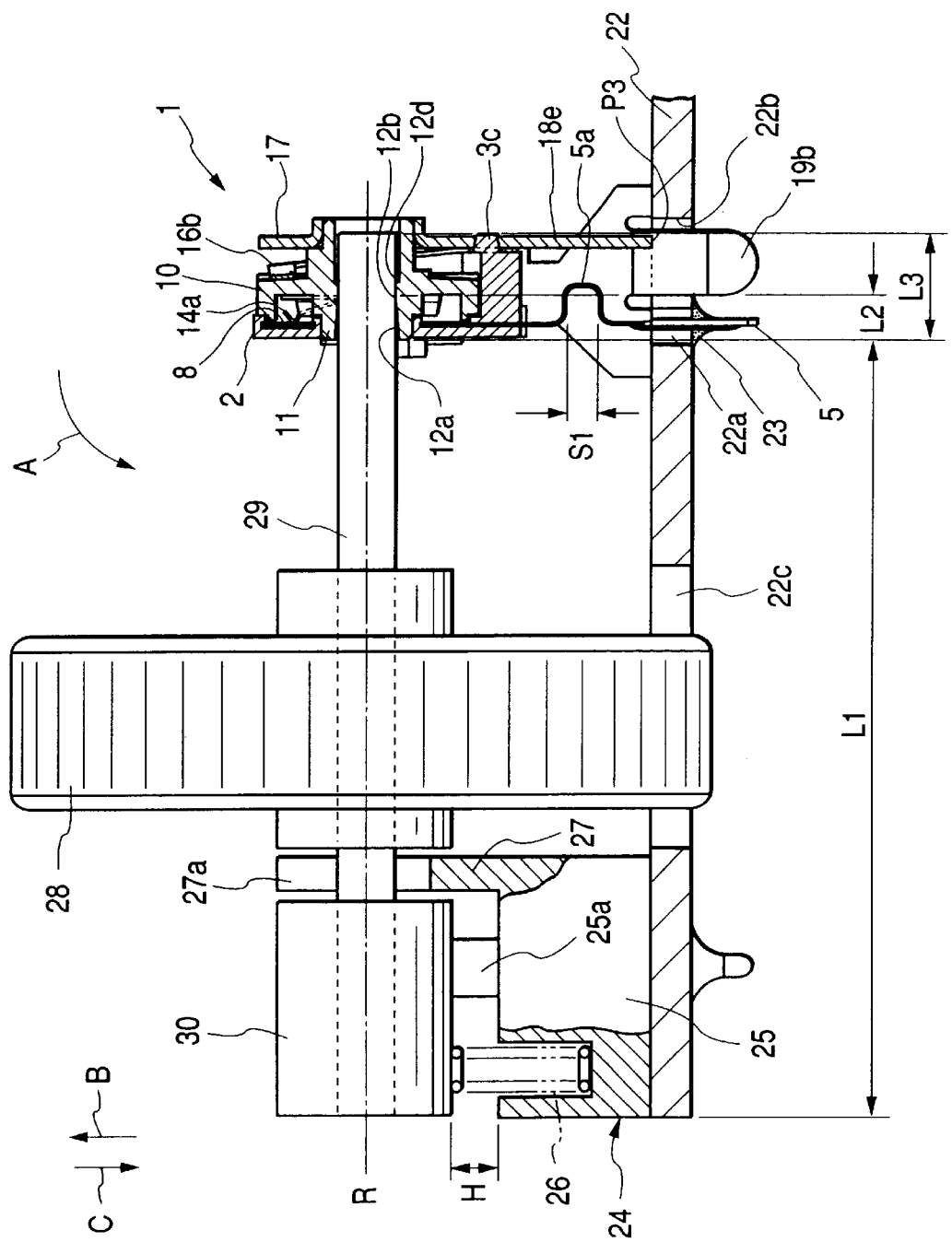
FIG. 16 is a cross sectional view of the input device of the present invention.

The rotary encoder 1 fabricated as described herein above is mounted on the circuit board 22 on which a circuit pattern not shown in the drawing is formed as shown in FIG. 16, and then served for use. Three terminal insertion holes 22a and two mounting holes 22b are formed on the circuit board 22, and the rotary encoder 1 is mounted on the circuit board 22 by engaging the mounting legs 19b to the mounting hole 22b, the three terminals 5, 6, and 7 are inserted into respective terminal insertion holes 22a and connected electrically to the above-mentioned circuit pattern by use of solder 23. Because the mounting legs 19b are not soldered at that time point, the rotary encoder 1 can be inclined in the direction of the arrow A round the contact point P3 between the extension 18e and the circuit board 22, and no load is loaded on the extra portions 5a, 6a, and 7a provided on respective terminals 5, 6, and 7, and the length of these portions is a natural length S1.

Figure 17:
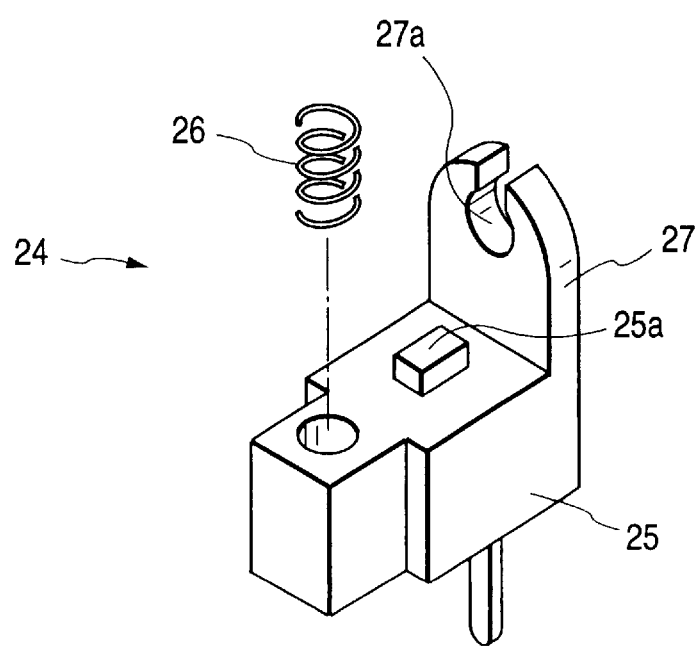
FIG. 17 is a perspective view of a push button switch provided to a circuit board in accordance with the input device of the present invention.

A relief hole 22c is formed on the circuit board 22, and a push button switch 24 is mounted so as to face to the rotary encoder 1 on the opposite side to the rotary encoder 1 with respect to the relief hole 22c. The push button switch 24 is provided with an actuator 25a on the body 25 connected and fixed to the circuit board 22, a coil spring 26 is mounted on the one end of the body 25, and a shaft support 27 having a slotted hole 27a with the open top end is formed on the other end of the body 25 as shown in FIG. 17.

A disk-shaped operation body 28 is provided between the rotary encoder 1 and the push button switch 24, a part of the operation body 28 is located in the relief hole 22c. The operation shaft 29 having a hexagonal cross section corresponding to the hole 12 of the rotation member 10 is fixed to the operation body 28 by means of insertion thereof through the center of the operation body 28. Both ends of the operation shaft 29 are inserted into the hole 12 of the rotation member 10 and the slotted hole 27a of the push button switch 24 respectively, and thus the operation body 28 and the rotation member 10 are rotatable together. The operation shaft 29 is supported so as to be inclined only in the vertical direction of the slotted hole 27a (direction of the arrows B and C) round the small diameter portion 12b of the rotation shaft 11 (rear end of the taper 12a).

A bush 30 is fitted to the one end of the operation shaft 29, the coil spring 26 and the actuator 25a are in contact with the bush 30 to maintain the operation shaft 29 in parallel to the circuit board 22. The bush 30 is located at the position facing to the body 25 of the push button switch 24 with interposition of a distance H, and the distance between the one end of the body 25 and the one end of the rotation shift 11 of the rotation member 10 is set to L1.

When an operator rotates the operation body 28 with a finger, the projection 16b of the moderation plate 16 is brought into contact elastically with the ridges 15a and grooves 15b of the radial ridges/grooves 15 alternately to cause clicking sensation concomitantly with rotation of the rotation member 10 together with the operation shaft 29 in the same direction as the operation body 28, as the result the three slider pieces 14a connects and disconnects with the plurality of conducting portions 8 concomitantly with rotation of the rotation member 10 and the pulse signal is generated. The pulse signal is sent out from the terminals 5, 6, and 7 as the rotation magnitude detection signal of the operation body 28, and supplied to the circuit board 22.

Figure 18:
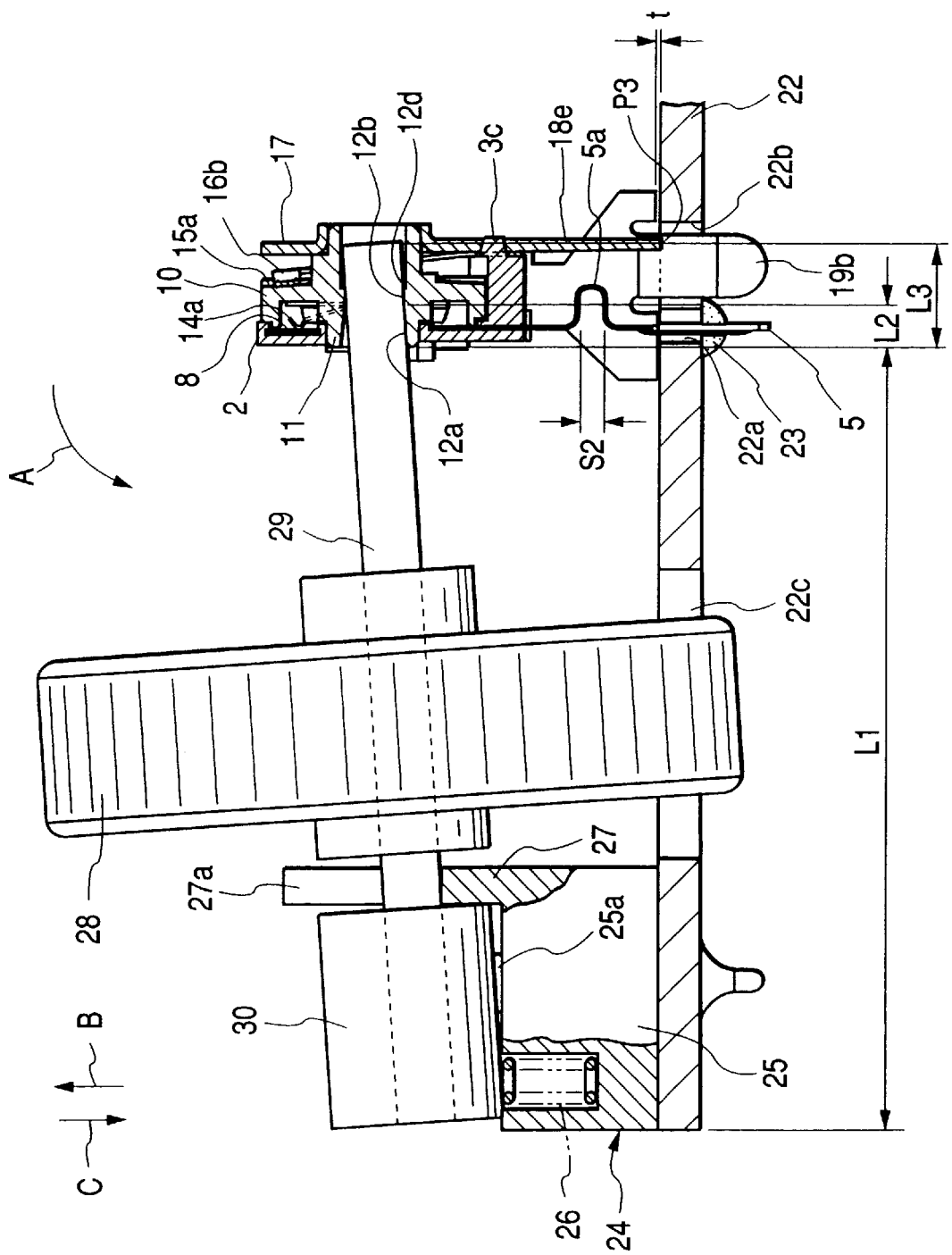
FIG. 18 is an explanatory diagram for describing the push button switch that is being driven provided to the circuit board in accordance with the input device of the present invention.

When an operator pushes the operation body 28 with a finger, the one end side to which the bush has been fitted is lowered by a distance H against the elastic force of the coil spring in the direction of the arrow C round the small diameter portion 12b (rear end of the taper 12a) of the rotation shaft 11, as the result the operation shaft 29 is inclined. As shown in FIG. 18, the bush 30 pushes the actuator 25a of the push button switch 24, the push button switch 24 is switched ON/OFF, and the ON/OFF signal of the push button switch 24 is supplied to the circuit board 22. At that time, the small diameter portion 12b of the rotation shaft 11 that will function as the inclination fulcrum is positioned on the one end of the rotation shaft 11 on the opposite side to the push button switch 24 with interposition of a distance L2 from the one end of the rotation shaft 11. Because the step 12d is provided and the inclination angle of the taper is equal to approximately 3 degrees as described hereinbefore so that the inclination of the operation shaft 29 is not hindered due to contact with the portion other than the small diameter portion 12b of the rotation shaft 11, though the positional relation between the rotary encoder 1 and the push button switch 24 is the same as that in the conventional art, the inclination angle $\theta 1$ of the operation shaft 29 is $\tan^{-1}$ (distance H÷(distance L1+distance L2), the inclination is smaller than that in the conventional art, the other end of the operation shaft 29 is supported by the taper 12a and the inclined operation shaft 29 is supported stably.

Figure 19:
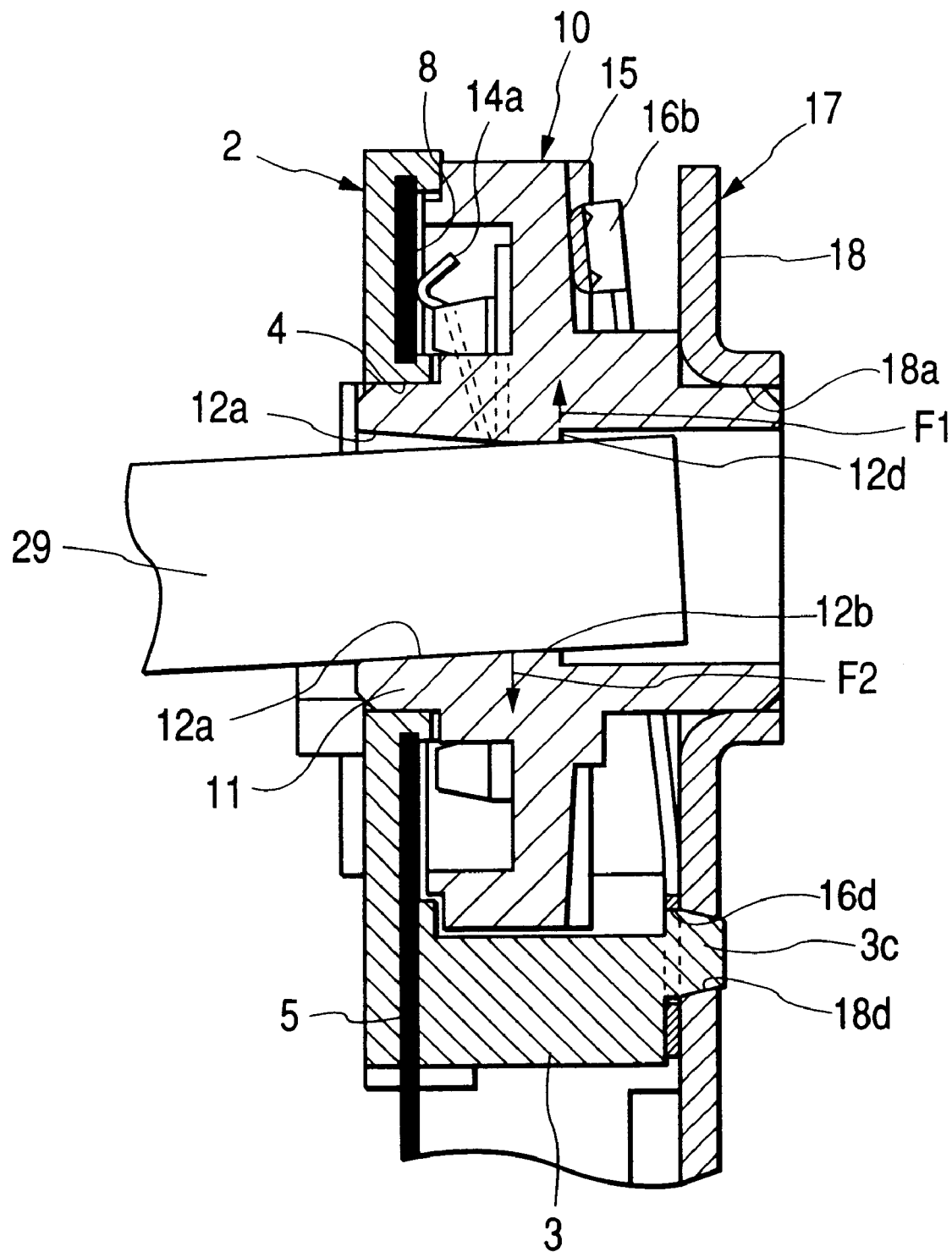
FIG. 19 is a partial cross sectional view of the input device of the present invention.
Figure 20:
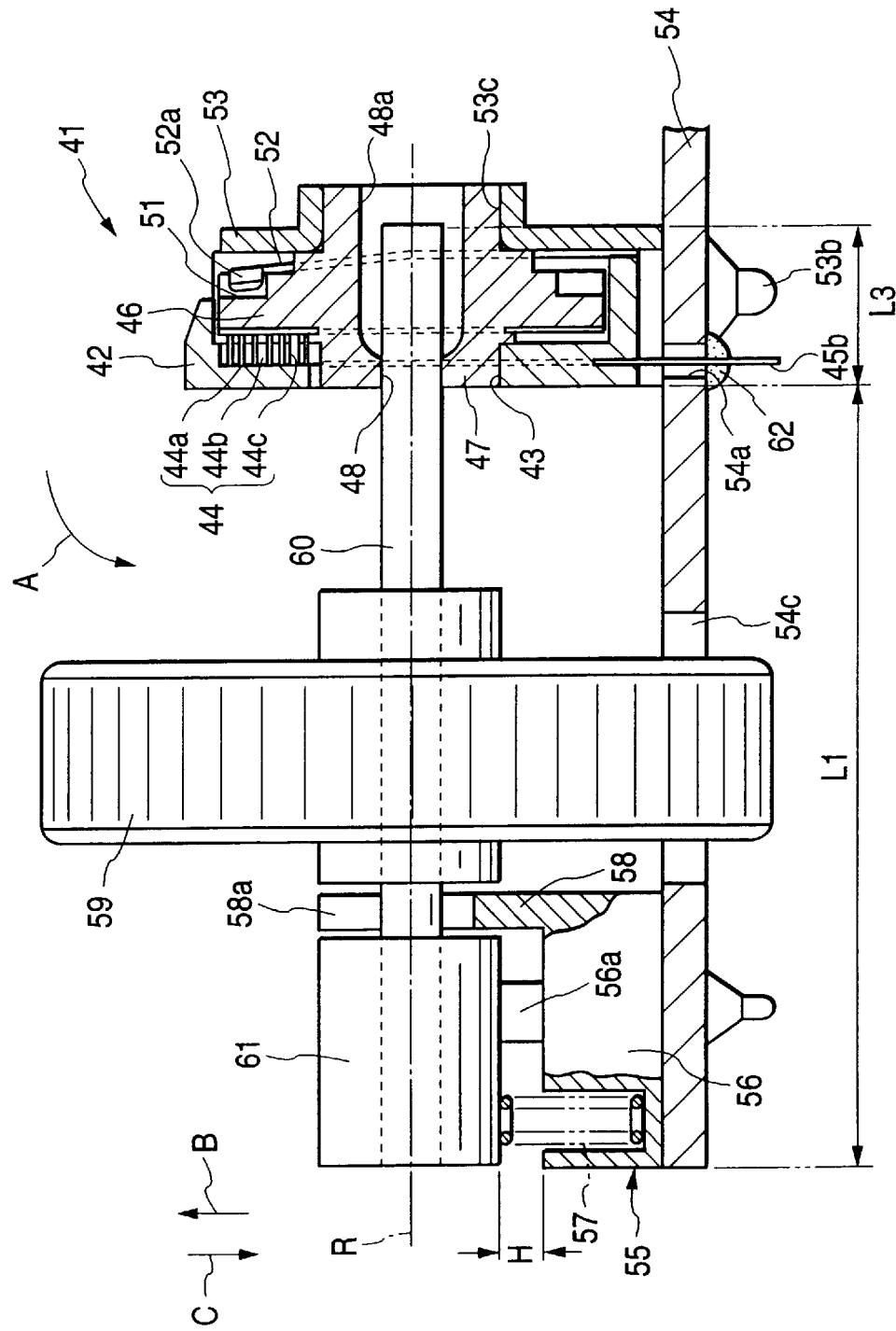
FIG. 20 is a cross sectional view of a conventional input device.
Figure 21:
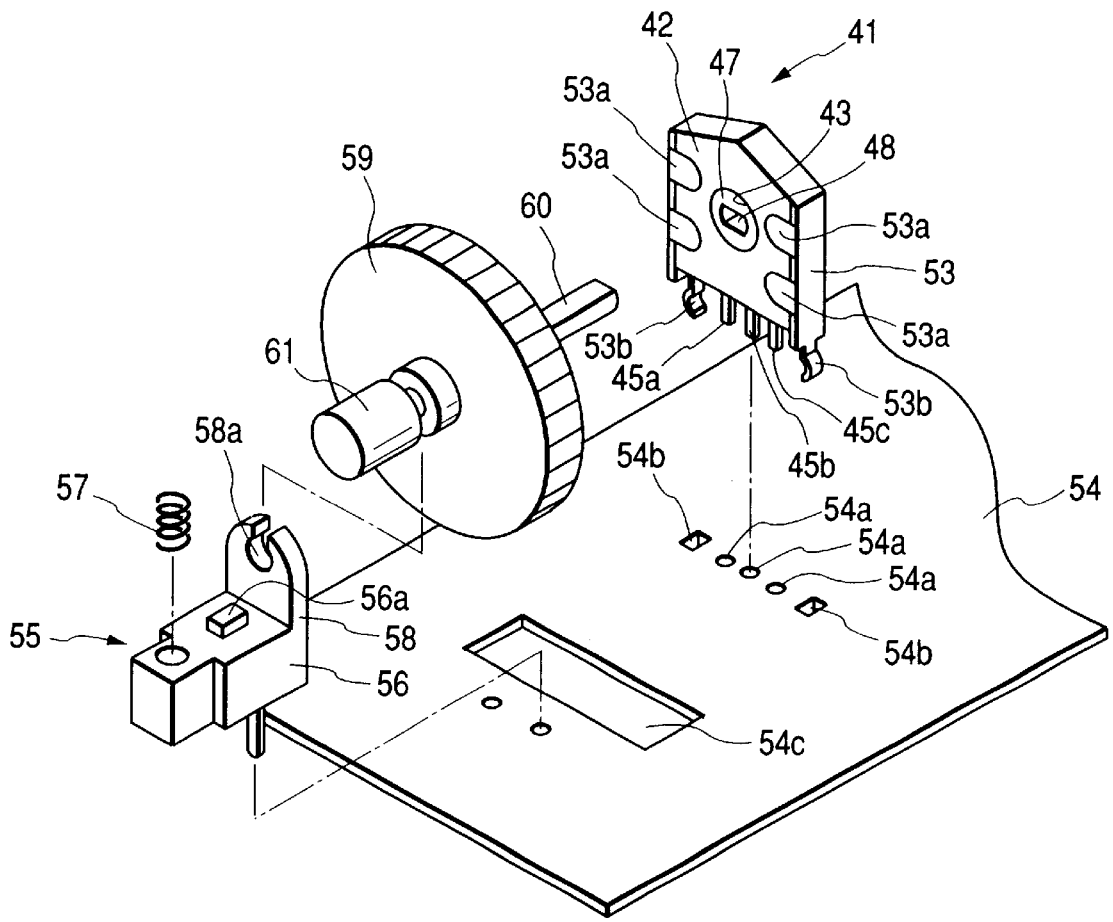
FIG. 21 is an exploded perspective view of FIG. 20.
Figure 22:
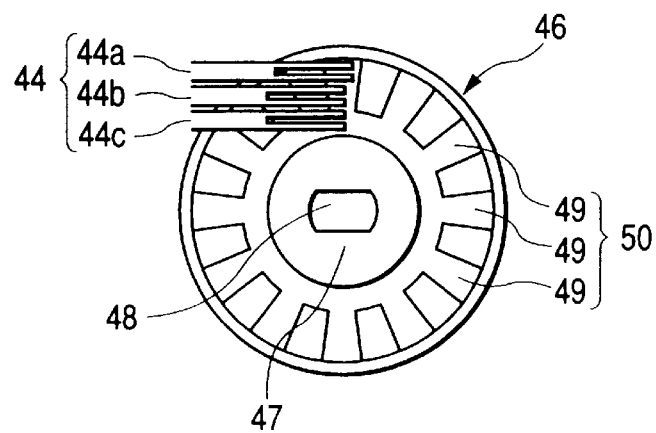
FIG. 22 is a front view of a rotation member provided to a rotation electrical component in accordance with the conventional input device.
Figure 23:
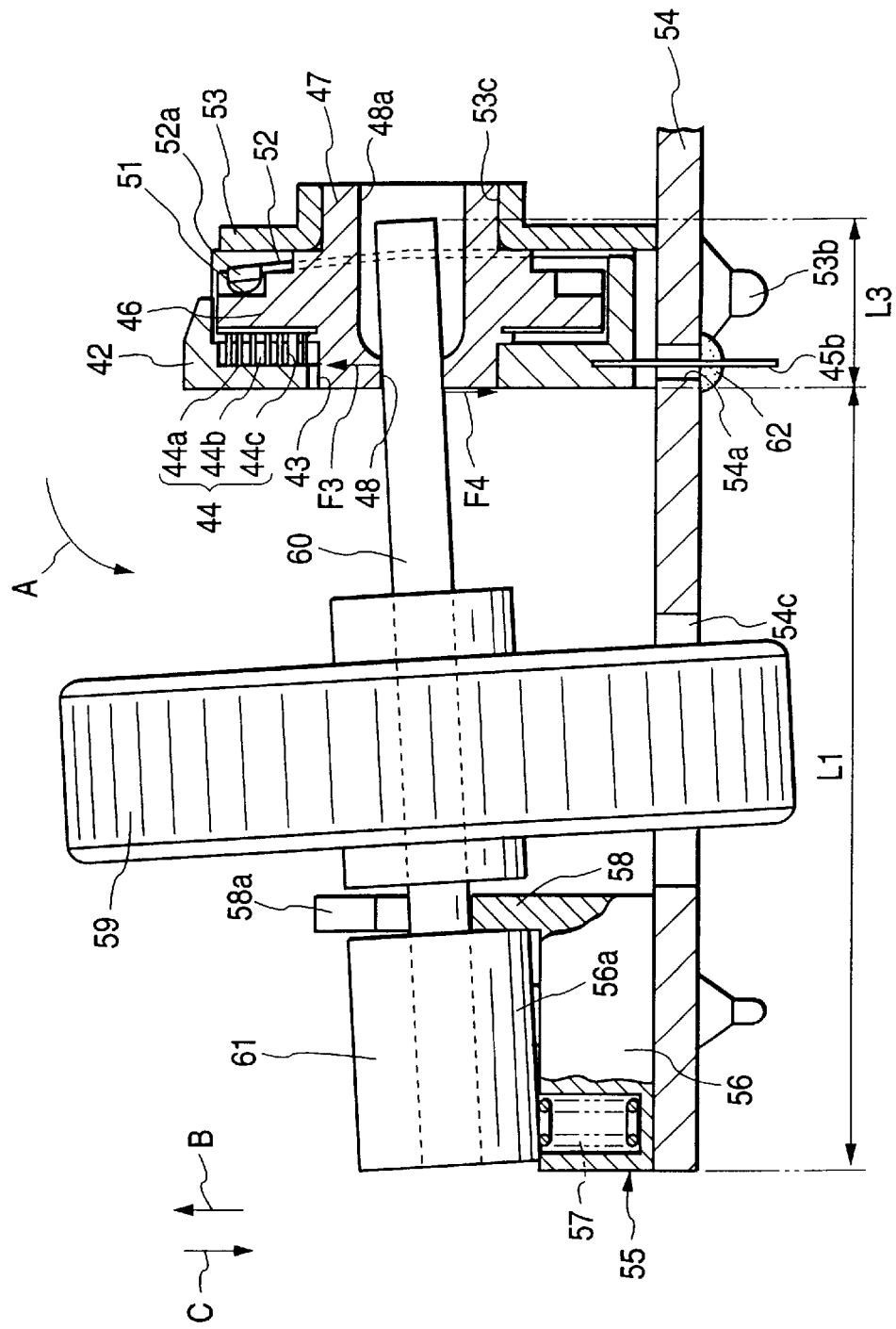
FIG. 23 is an explanatory diagram for showing the push button switch that is being driven provided to the circuit board in accordance with the conventional input device.

Therefore, when the operation shaft 29 is inclined, though the upward force F1 and downward force F2 are exerted on the contact point between the small diameter portion 12b of the rotation member 10 and the other end of the operation shaft 29 as shown in FIG. 19, the magnitude of the forces is smaller than that in the conventional art in which the inclination of the operation shaft 29 is small. Because the reaction force of F1 and F2 exerted on the operation shaft 29 is small, the operation shaft 29 can be inclined smoothly. Because the upward and downward forces F1 and F2 are suppressed, the moment in the direction of the arrow A exerted on the rotary encoder 1 is reduced and the inclination magnitude of the rotary encoder 1 in the direction of the arrow A is reduced, the load exerted on the connection between the terminals 5, 6, and 7 and the circuit board 22 (portion to which solder 23 is provided) is reduced. Because the inclination of the operation shaft 29 is small, the diameter of the large diameter portion of the rotation shaft 11, which is provided to avoid the contact with the operation shaft 29, can be reduced, the rotation member 10 can be formed smaller, and thus the small-sized rotary encoder 1 is realized. Furthermore, because the cross sections of the hole 12 of the rotation member 10 and the operation shaft 29 to be inserted to the hole 12 are both equilateral hexagonal, the operation shaft 29 can be inclined smoothly at any rotation angle position of the rotation member 10.

Furthermore, because the operation shaft 29 is fitted at the center of the rotation member 10 and the operation shaft 29, and the operation shaft 29 moves by a distance approximately (L3/2) tan θ1 in the radial direction at the position near both opening ends of the hole 12, in this meaning, the diameter of the large diameter portion 12*c* of the rotation shaft 11, which is provided to avoid the contact with the operation shaft 29, can be formed smaller than that in the case of the conventional art, the rotation member 10 is miniaturized, and thus the small-sized rotary encoder 1 is realized. The small diameter portion 12 has a flat surface to ensure the fitting to the operation shift 29, and the rotation member 10 tends to be thereby inclined concomitantly with inclination of the operation shaft 29. However, in the present embodiment, because the operation shaft 29 is fitted at the center of the rotation member 10 in the rotation shift line R direction and the operation shaft 29 is in contact with the bearing with interposition of the rotation shift 11 of the rotation member 10, in this meaning, the damage on the support portion of the rotation member 10 is suppressed in comparison with the conventional case.

As shown in FIG. 18, the rotary encoder 1 is inclined in the direction of the arrow A concomitantly with inclination of the operation shaft 29, at that time because the projection 16*b* of the moderation plate 16 is fallen in the groove 15*a* of the radial ridges/grooves 15 of the rotation member 10, the rotary encoder 1 is inclined smoothly round the contact point P3 between the extension 18*e* formed monolithically on the back wall 18 of the mounting plate 17 and the circuit board 22 without rotation of the rotation member 10, a gap t is formed between the circuit board 22 and the rotary encoder 1, the extra portions 5*a*, 6*a*, and 7*a* of the respective three terminals 5, 6, and 7 shrink from the natural length S1 to shrink length S2 to absorb the inclination magnitude of the rotary encoder 1. As the result of absorption, the load exerted on the contact between the terminals 5, 6, and 7 and the circuit board 22 is eliminated due to inclination of the rotary encoder 1, and the connection between the terminals 5, 6, and 7 and the circuit board 22 is maintained in good condition.

When the operator stops pressing of the operation body 28, the operation body 28 and the operation shaft 29 are restored (in the direction of the arrow C) to the original position by means of the elastic force of the coil spring 26, and the rotary encoder 1 is restored (in the direction of the arrow A) to the original position by means of the elastic force of the extra portions 5*a*, 6*a*, and 7*a* of the respective terminals 5, 6, and 7. As the result, the rotation magnitude detection signal of the operation body 28 and ON/OFF signal of the push button switch 24 supplied to the circuit board 22 are subjected to arithmetic by means of a CPU not shown in the drawing of the circuit board 22, then supplied-to a display apparatus not shown in the drawing, and the screen scroll on the display not shown in the drawing and control of a cursor are carried out.

In the present embodiment, the rotation member 10 is provided with the detection target 20, and the support member 2 is provided with the detector 9, but otherwise the rotation member 10 is provided with the detector 9, and the support member is provided with the detection target 20. In the present embodiment, the pulse signal generation unit for generating the pulse signal concomitantly with rotation of the rotation member 10 comprises the detection target 20 comprising the slider 14 and the detector 9 comprising a plurality of conducting portions 8, but the present invention is by no means limited to this structure, but otherwise the pulse generation unit may be structured by use of VR type encoder, combination of a slider and resistor such as a variable resistor, or combination of a magnet and hole element.

What is claimed is:

1. An input device comprising;
    rotational electrical component having a fixing member, a rotation member supported rotatably by the fixing member, and a terminal to generate an electric signal generated concomitantly with rotation member,
    a circuit board to which the terminal is connected and the electric signal is supplied,
    an operation shaft formed to extend in a shaft line direction of the rotation member and having one end fitted to the rotation member to rotate the rotation member, and
    an operation body provided to the operation shaft,
    wherein the terminal has a flexible portion that is bent when the rotational electrical component is inclined concomitantly with a pushing operation of the operation body in a perpendicular direction to a shaft center of the rotation member,
    a mounting plate to mount the rotational electrical component on the circuit board is provided to the fixing member, and
    an extension that is in contact with the circuit board is provided to the mounting plate to face the opposite side of the terminal that is facing the operation body, and the rotational electrical component is inclined round the contact portion between the extension and the circuit board concomitantly with the pushing operation of the operation body.

2. The input device according to claim 1, wherein the extension provided to the mounting plate is in contact with a plate surface of the circuit board.

3. The input device according to claim 1, wherein an extra portion is provided on the terminal, and the flexible portion is formed of the extra portion.

4. The input device according to claim 3, wherein the extra portion is formed by bending the terminal in a C-shape.

5. The input device according to claim 4, wherein the extra portion is formed such that an opening of the C-shape faces the operation body.

6. The input device according to claim 1, wherein a plurality of terminals are provided, and the plurality of terminals are formed projectingly from the fixed member toward the circuit board to be arranged on one plane perpendicular to the rotation shaft line of the operation shaft.

7. The input device according to claim 1, wherein a push button switch that is driven by the pushing operation of the operation body is provided.

8. An input device comprising;
    a fixing member, a rotation member supported rotatably by the fixing member having a hole that extends in a rotation shaft line direction, and a rotational electric component to generate an electric signal concomitantly with rotation of the rotation member,
    an operation shaft having one end inserted into the hole of the rotation member to rotate the rotation member, and
    an operation body provided to the operation shaft,
    wherein
        the hole has a polygonal hole provided on an operation body side into which the one end of the operation shaft is inserted and has a hole having a diameter larger than that of the polygonal hole provided next to the polygonal hole, a taper having a diameter that decreases from a large diameter at one end facing the operation body to a small diameter at an opposing end on an inside circumferential surface of the polygonal hole is provided, and a step is formed between the polygonal hole and the large diameter hole.

9. The input device according to claim 8, wherein an angle made by the taper and the rotation shaft line is 3 degrees.

10. The input device according to claim 9, wherein the polygonal hole is a hexagonal hole.

11. An input device provided with a fixing member and a rotation member supported rotatably by the fixing member, wherein a through hole that penetrates in a rotation shaft line direction of the rotation member is provided on the fixing member at a position outside the rotation member, wherein the fixing member comprises a support member, a moderation plate to effect a clicking sensation concomitantly with rotation of the rotation member, and a mounting plate to hold the support member and the moderation plate together.

12. The input device according to claim 11, wherein two through holes are formed on the fixing member.

13. The input device according to claim 11, wherein a pair of stopper holes that face each other with interposition of the through hole are formed on the mounting plate on both sides of the through hole, and a pair of projections fitted to a the pair of holes are provided on the support member.

14. The input device according to claim 11, herein a pair of stopper holes that face each other with interposition of the through hole are formed on, the mounting plate on both sides of the through hole, a pair of stopper holes that penetrate facing the pair of stopper holes of the mounting plate are provided on the moderation plate, and a pair of engaging projections inserted into the pairs of stopper holes of the respective mounting plate and moderation plate are provided projectingly on the support member.

* * * * *

UNITED STATES PATENT AND TRADEMARK OFFICE
CERTIFICATE OF CORRECTION

PATENT NO.      : 6,507,334 B1                                                                Page 1 of 1
DATED           : January 14, 2003
INVENTOR(S)     : Kenji Yamazaki It is certified that error appears in the above-identified patent and that said Letters Patent is hereby corrected as shown below:

Column 14,
Line 8, insert -- a -- before "rotational".

Column 16,
Line 8, after "fitted to" delete "a".
Line 10, delete "herein" and substitute -- wherein -- in its place.
Line 12, delete "," (comma) after "formed on".

Signed and Sealed this

Seventeenth Day of June, 2003

JAMES E. ROGAN
*Director of the United States Patent and Trademark Office*